(12) United States Patent
Gaßner

(10) Patent No.: US 12,715,278 B2
(45) Date of Patent: Aug. 25, 2026

(54) METHOD FOR OPERATING A VEHICLE AND FOR DECOUPLING A HYBRID DRIVE TRAIN FROM AN ENERGY SUPPLY OF THE VEHICLE

(71) Applicant: Audi AG, Ingolstadt (DE)

(72) Inventor: Andreas Gaßner, Abensberg (DE)

(73) Assignee: Audi AG, Ingolstadt (DE)

( * ) Notice: Subject to any disclaimer, the term of this patent is extended or adjusted under 35 U.S.C. 154(b) by 299 days.

(21) Appl. No.: 17/840,487

(22) Filed: Jun. 14, 2022

(65) Prior Publication Data

US 2022/0396139 A1 Dec. 15, 2022

(30) Foreign Application Priority Data

Jun. 15, 2021 (DE) ........................ 102021115476.6

(51) Int. Cl.
*B60W 20/00* (2016.01)
*B60K 6/445* (2007.10)
(Continued)

(52) U.S. Cl.
CPC ................ *B60K 6/445* (2013.01); *B60K 6/52* (2013.01); *B60W 10/02* (2013.01)

(58) Field of Classification Search
CPC .......... B60K 6/52; B60K 6/442; B60K 6/445; B60W 10/06; B60W 10/08
See application file for complete search history.

(56) References Cited

U.S. PATENT DOCUMENTS 6,941,198 B2 * 9/2005 Brigham .................. B60K 6/48 180/65.28
8,647,231 B2 * 2/2014 Soliman ................ B60W 10/02 477/181

(Continued)

FOREIGN PATENT DOCUMENTS

DE 102008000132 A1 7/2009
DE 102010023990 A1 12/2011

(Continued)

OTHER PUBLICATIONS

"BOSCH Automotive Engineering Handbook, Chinese 4th Edition, German 27th Edition", Konrad Reif, pp. 637-642, Beijing Institute of Technology Press, Jan. 2016. (18 pages).

*Primary Examiner* — Gonzalo Laguarda
(74) *Attorney, Agent, or Firm* — Seed Intellectual Property Law Group LLP

(57) ABSTRACT

A vehicle comprises a combustion engine, an electric machine, a front axle with front driving wheels, a rear axle with rear driving wheels, at least one electric module, at least one primary power transmission device and at least one secondary power transmission device. The electric machine is connected across the at least one primary power transmission device to at least one driving wheel of a first one of the two axles or separated from the at least one driving wheel of the first one of the two axles. The combustion engine is connected across the at least one primary power transmission device to at least one driving wheel of a second one of the two axles or separated from the at least one driving wheel of the second one of the two axles. The electric machine is connected across the at least one secondary power transmission device to the combustion engine or separated from the combustion engine. Two energy transfer functions are carried out for the vehicle, wherein the electric machine in the energy transfer functions is separated (Continued)

by the at least one primary power transmission device from the at least one driving wheel and it is connected by the at least one secondary power transmission device to the combustion engine, wherein a generator operation is carried out by the electric machine when carrying out a first energy transfer function, wherein mechanical energy of the operating combustion engine is transformed into electrical energy by the electric machine and provided to the at least one electric module, and wherein a motor operation is carried out by the electric machine when carrying out a second energy transfer function, wherein electric energy from the at least one electric module is transformed into mechanical energy by the electric machine and provided to the combustion engine.

12 Claims, 1 Drawing Sheet

(51) Int. Cl.

| | |
|---|---|
| ***B60K 6/52*** | (2007.10) |
| *B60W 10/02* | (2006.01) |

(56) References Cited

U.S. PATENT DOCUMENTS

| | | | | |
|---|---|---|---|---|
| 9,651,120 | B2 * | 5/2017 | Morrow | F16H 3/727 |
| 2003/0136597 | A1 | 7/2003 | Raftari et al. | |
| 2012/0006152 | A1 * | 1/2012 | Fuechtner | B60W 10/113<br>903/909 |
| 2012/0022731 | A1 * | 1/2012 | Kuang | B60K 6/52<br>180/65.21 |
| 2014/0163793 | A1 * | 6/2014 | Kim | B60W 20/40<br>903/902 |
| 2015/0224867 | A1 | 8/2015 | Nett et al. | |
| 2018/0319278 | A1 | 11/2018 | Davis et al. | |
| 2022/0145841 | A1 | 5/2022 | Nießing | |

FOREIGN PATENT DOCUMENTS

| | | | |
|---|---|---|---|
| DE | 102016100788 | A1 | 7/2017 |
| DE | 102017212554 | A1 | 1/2019 |
| DE | 102018203338 | A1 | 9/2019 |
| DE | 102020129685 | A1 | 12/2021 |
| EP | 3450234 | A1 | 3/2019 |
| WO | 2009/021574 | A1 | 2/2009 |
| WO | 2014/033137 | A1 | 3/2014 |

* cited by examiner

METHOD FOR OPERATING A VEHICLE AND FOR DECOUPLING A HYBRID DRIVE TRAIN FROM AN ENERGY SUPPLY OF THE VEHICLE

BACKGROUND

Technical Field

Embodiments of the invention relate to a method for operating a vehicle and a system for operating a vehicle.

Description of the Related Art

A vehicle can comprise a combustion engine and an electric machine for its propulsion. It is possible for this vehicle to be driven optionally with the combustion engine and/or with the electric machine.

A dump truck for a mine is known from document EP 3 450 234 A1.

Document US 2003/136597 A1 describes a method and a system for separating an electrically driven vehicle from driving wheels of a drive train.

A method for separating and connecting a tandem axle of a vehicle is described in document US 2018/319278 A1.

Given this background, one problem was to operate a vehicle effectively.

BRIEF SUMMARY

The method according to some embodiments of the invention is intended for operating a vehicle, such as a motor vehicle and/or an automobile. This vehicle comprises a combustion engine as a drive unit, an electric machine as a drive unit, a front axle with front driving wheels, a rear axle with rear driving wheels, at least one electric module, at least one primary power transmission device and at least one secondary power transmission device. The electric machine is connected across the at least one primary power transmission device either to at least one driving wheel of a first one of the two axles or it is separated from the at least one driving wheel of the first one of the two axles, wherein the at least one primary power transmission device is either closed or opened. Furthermore, the combustion engine is connected across the at least one primary power transmission device either to at least one driving wheel of a second one of the two axles or it is separated from the at least one driving wheel of the second one of the two axles, wherein the at least one primary power transmission device is either closed or opened. Moreover, the electric machine is connected across the at least one secondary power transmission device to the combustion engine or it is separated from the combustion engine, wherein the at least one secondary power transmission device is closed or opened. In the method, at least two energy transfer functions are carried out and/or provided for the vehicle. In both energy transfer functions the electric machine is separated or decoupled by the at least one opened primary power transmission device from the at least one driving wheel and it is connected by the at least one closed secondary power transmission device to the combustion engine. It is provided that a generator operation is carried out by the electric machine when carrying out a first energy transfer function, wherein mechanical energy of the operating combustion engine is transformed into electrical energy by the electric machine and provided or transferred to the at least one electric module. A motor operation is carried out by the electric machine when carrying out a second energy transfer function, wherein electric energy from the at least one electric module is transformed into mechanical energy by the electric machine and provided to the combustion engine, which has been standing still prior to this, and it is possible to start the combustion engine in this process.

The vehicle has a P4 hybrid architecture, the vehicle being operated according to the P4 hybrid architecture when carrying out the method. The vehicle with the electric machine and the combustion engine comprises two drive units and two axles with driving wheels. One of the two drive units is associated with one of the two axles and is releasably connected to the driving wheels arranged on it. On the other hand, the other one of the two drive units is associated with the other one of the two axles and is releasably connected to the driving wheels arranged on it. In one embodiment, it is possible for a drive unit to be associated exclusively with one of the two axles and to be releasably connected exclusively to only the driving wheels arranged on it. If a drive unit is associated with both of the axles, an all-wheel system is realized for or presented by the vehicle. It is also possible to associate both of the drive units with both axles at the same time.

At least one of the two energy transfer functions is carried out in one embodiment when the vehicle is standing still or stationary. In an alternative embodiment, at least one of the two energy transfer functions is carried out when the vehicle is moving, i.e., when it is traveling, e.g., rolling or coasting. It is possible to carry out a respective energy transfer function when one of the mentioned drive units, i.e., the electric machine or the combustion engine, is shut down or switched off, and the other drive unit is switched on. A respective energy transfer function can be carried out and/or activated depending on a particular speed of the vehicle. For example, the respective energy transfer function can be carried out and/or activated in a pushing or coasting operation of the vehicle. In this case, one drive train of the vehicle, having the power transmission devices presented here as its components, among others, can be disengaged, whereupon the driving wheels are separated, decoupled and/or uncoupled from the two drive units. When carrying out the respective energy transfer function, the vehicle will be rolling. It is possible to separate and/or decouple a hybrid drive train from an energy supply of the vehicle.

In the method, a battery as an electrical energy accumulator, an electrical onboard network and/or an electrical consumer, generally an electrical appliance, such as a component of an air conditioning system, such as an air conditioning compressor, is used and/or employed as the at least one electric module of the vehicle, it being possible to integrate the battery or a storage cell and/or the component of the air conditioning system in the onboard network of the vehicle. Furthermore, the battery as the at least one electric module will be charged with electric energy from the electric machine when carrying out the first energy transfer function. It is also possible to use for example a fuel cell of the vehicle in one possible embodiment as the electric module, such as an energy accumulator, or as a drive unit.

Alternatively or additionally, the onboard network and/or the at least one electrical consumer as a possible component of the onboard network is supplied with electric energy from the electric machine and thus an operation of this at least one electric module is maintained. The onboard network comprises conductors by which the electric modules of the vehicle are connected to each other.

In a first configuration, it is possible for the electric machine to be spatially associated with rear driving wheels on the rear axle of the vehicle and to be connected usually directly to the rear driving wheels across the at least one primary power transmission device. In this case, the electric machine is arranged at and/or on the rear axle and/or associated with the rear driving wheels. It is also possible for the electric machine to be integrated in the rear axle and/or a rear axle transmission as a power transmission device, the rear axle being thus electrified.

Optionally, in the first configuration, it is further possible for this electric machine, being spatially associated with the rear driving wheels, to be connected usually indirectly to the front driving wheels on the front axle of the vehicle. Alternatively, the electric machine is associated exclusively with the rear driving wheels.

In this first configuration, it is provided that the combustion engine is spatially associated with the front driving wheels on the front axle of the vehicle and connected, usually directly, to the front driving wheels across the at least one primary power transmission device. The combustion engine in this case is arranged at and/or on the front axle and/or associated with the front driving wheels.

Optionally, in the first configuration, it is further possible for this combustion engine, being spatially associated with the front driving wheels, to be connected usually indirectly to the rear driving wheels on the rear axle of the vehicle. Alternatively, the combustion engine is associated exclusively with the front driving wheels.

In a second alternative configuration, it is possible for the electric machine to be spatially associated with front driving wheels on the front axle of the vehicle and to be connected usually directly to the front driving wheels across the at least one primary power transmission device. In this case, the electric machine is arranged at and/or on the front axle and/or associated with the front driving wheels. It is also possible for the electric machine to be integrated in the front axle and/or a front axle transmission as a power transmission device, the front axle being thus electrified.

Optionally, in the second configuration, it is further possible for this electric machine, being spatially associated with the front driving wheels, to be connected usually indirectly to the rear driving wheels on the rear axle of the vehicle. Alternatively, the electric machine is associated exclusively with the front driving wheels.

In this second configuration, it is provided that the combustion engine is spatially associated with the rear driving wheels on the rear axle of the vehicle and connected, usually directly, to the rear driving wheels across the at least one primary power transmission device. The combustion engine in this case is arranged at and/or on the rear axle and/or associated with the rear driving wheels.

Optionally, in the second configuration, it is further possible for this combustion engine, being spatially associated with the rear driving wheels, to be connected usually indirectly to the front driving wheels on the front axle of the vehicle. Alternatively, the combustion engine is associated exclusively with the rear driving wheels. Regarding a spatial position of at least one of the drive units, this may be arranged in the front, at the middle, or in the rear of the vehicle, the spatial position being independent of which axle the at least one drive unit is connected to. Accordingly, the combustion engine can be designed or designated as a central engine or a rear engine. It is also possible for both drive units, i.e., the combustion engine and the electric machine, to be associated spatially with one axle.

With each of the above described drive arrangements to realize a P4 hybrid architecture having a respective rear axle transmission or front axle transmission, a torque vectoring or torque distribution can also be carried out for a respective rear or front axle, it being possible to generate a specific driving dynamics in the vehicle, with torque distributed among driving wheels of the same axle by a speed modulation gearbox.

Usually the distance from the electric machine to a rear driving wheel is less than that for a front driving wheel of the vehicle. In an alternative embodiment, the electric machine is arranged at and/or on the front axle and/or associated with the front driving wheels. It is also possible for the electric machine to be integrated in the front axle and/or a front axle transmission as a power transmission device, the front axle being thus electrified. Usually the distance from the electric machine to a front driving wheel is less than that for a rear driving wheel of the vehicle. It is also possible for at least one drive unit, i.e., the combustion engine and/or the electric machine, to be configured as a rear engine.

In the method, it is possible to use a hang-on coupling as a coupling, for example a coupling arrangement, a shaft, and/or a transmission, such as a rear axle transmission or front axle transmission, as the at least one primary power transmission device between the electric machine and the driving wheels. The hang-on coupling in this case can be designed or designated as a friction-disc coupling, a shiftable freewheeling coupling, or a claw coupling.

Furthermore, a shaft, generally an articulated shaft and/or transmission shaft, especially a Cardan shaft, a shaft, a coupling, such as a coupling arrangement, and/or a transmission is used as the at least one secondary power transmission device between the electric machine and the combustion engine.

Furthermore, in one possible embodiment of the method it is provided that at least one driving function is carried out for the vehicle, wherein the at least one secondary power transmission device is opened between the electric machine and the combustion engine, whereupon the electric machine and the combustion engine are separated from each other. Furthermore, the at least one primary power transmission device is closed or opened between the electric machine and at least one driving wheel on at least one axle of the vehicle, whereupon the electric machine is connected to or separated from the at least one driving wheel. It is possible for the at least one driving wheel to be purely electrically driven by the electric machine, e.g., electromechanically, purely driven by the combustion engine, or hybrid driven by both the electric machine and the combustion engine. Furthermore, it is possible for only front driving wheels on the front axle, only rear driving wheels on the rear axle, or all the driving wheels on both axles to be driven, carrying out an all-wheel drive by the electric machine and/or the combustion engine. In a standstill function of the vehicle, the drive units are mechanically separated or decoupled from the driving wheels.

The method in one embodiment is carried out for a vehicle comprising multiple axles, generally two axles, i.e., a front and a rear axle, with driving wheels arranged on them, wherein multiple gears are provided for at least one axle, and the vehicle comprises an at least single-gear, i.e., a single-gear or multiple-gear, rear axle and/or front axle.

The system according to some embodiments of the invention is designed to operate a vehicle, such as a motor vehicle, this system being furthermore designed to carry out one embodiment of the method described above. The vehicle for which this system is designed comprises a combustion engine, an electric machine, driving wheels arranged on at least one front axle and one rear axle, at least one electric module, at least one primary power transmission device and at least one secondary power transmission device. The electric machine can be connected or is to be connected or is releasably connected, as one chooses, across the at least one either closed or opened primary power transmission device to at least one driving wheel of a first one of the two axles, or it is to be decoupled or can be decoupled or separated from the at least one driving wheel of the first one of the two axles. Furthermore, the combustion engine can be connected or is to be connected or is releasably connected, as one chooses, across the at least one either closed or opened primary power transmission device to at least one driving wheel of a second one of the two axles, or it is to be decoupled or can be decoupled or separated from the at least one driving wheel of the second one of the two axles. Moreover, the electric machine can be connected or is to be connected or is releasably connected across the at least one closed or opened secondary power transmission device to the combustion engine or it is to be separated or decoupled or can be decoupled from the combustion engine. The system proposed here comprises a control unit for monitoring and thus controlling and/or regulating the above proposed method. The control unit is adapted to monitor and thus control and/or regulate the performance of at least two different energy transfer functions for the vehicle, when the vehicle is either standing still or moving, i.e., driving and/or rolling. It is possible to disengage the drive train, i.e., to decouple or separate the drive units from the driving wheels and carry out the generator operation with the electric machine, thereby carrying out a coasting operation for the vehicle.

Furthermore, the control unit is adapted to open the at least one primary power transmission device between the electric machine and the at least one driving wheel and to separate the electric machine in both energy transfer functions from the at least one driving wheel. Moreover, the control unit is adapted to close the at least one secondary power transmission device and connect the electric machine to the combustion engine. The control unit is also adapted to make the electric machine carry out a generator operation in order to carry out a first energy transfer function, wherein mechanical energy of the operating combustion engine is or can be transformed into electric energy of the electric machine and is or can be provided to the at least one electric module. The control unit is moreover adapted to make the electric machine carry out a motor operation in order to carry out a second energy transfer function, wherein the electric machine is adapted to transform electric energy from the at least one electric module into mechanical energy and provide this to the combustion engine, which was standing still prior to this. It is possible for the combustion engine to set a particular dead center and to position its crankshafts accordingly, in order to start it in optimal manner by the electric machine; for example, the first cylinder can be rotated to just before an upper dead center. Furthermore, a so-called shut-down shaking can be dampened when the combustion engine is shut down starting from idling, in which case the combustion engine will be started by the electric machine, and the combustion engine will run at constant revolutions. It is possible to mechanically operate an air conditioning processor with the combustion engine. A shutdown shaking is a rotational swinging about a longitudinal axis of a crankshaft, caused by the compressing of air in a cylinder of the combustion engine, without going beyond the dead center of the combustion engine.

The control unit is adapted to monitor the method automatically and with software support and to decide, when the vehicle is standing still or during its movement, whether one of the two energy transfer functions is or should be carried out. The control unit can recognize whether it is required to supply electric energy to the at least one electric module and to charge the battery, for example, and/or to supply electric energy to at least one other electric module, wherein the control unit will make such a decision by taking into account the current state of charge (SOC) of the battery, and in this case the control unit will automatically order the first energy transfer function to be carried out. It is also possible for the control unit to correspondingly control or monitor another energy accumulator, such as a fuel cell, and the condition thereof. Moreover, the control unit can recognize whether it is required to supply electric energy to the combustion engine, in which case the control unit automatically orders the second energy transfer function to be carried out. The controller is connected by conductors of the onboard network to components of the vehicle, i.e., to drive units, and thus to the combustion engine and the electric machine, to power transmission devices, and to electric modules, and it exchanges signals with these components by the conductors, by which the control unit controls and/or monitors these components. With such signals, the control unit provides information as to a particular condition of a particular component, such information about the particular component being detected by a sensor associated with that component.

With the method, it is possible to decouple the electric machine from the driving wheels through or by the at least one primary power transmission device, such as the transmission, the coupling and/or the Cardan shaft, and to use it to supply electric energy for the at least one electric module of the vehicle. Thus, it is possible to economize on a second electric machine, if at least one already available primary power transmission device, such as the hang-on coupling, for example a friction-disc coupling, shiftable freewheeling coupling, or claw coupling, and/or a drive shaft decoupling can be intelligently controlled, for example with software support, and utilized and/or used by the control unit as a decoupling element.

In one configuration, the electric machine and/or the combustion engine can be installed on a conventional transmission as a power transmission device. Furthermore, a drive train provided for all-wheel drive, such as an all-wheel drive train, is connected to the transmission across the hang-on coupling. This coupling may be configured to dynamically conduct a drive torque of the electric machine, arriving from an output of the transmission, to the rear or front axle and thus to the rear or front driving wheels of the vehicle. This coupling is furthermore designed to dynamically conduct a drive torque of the combustion engines, arriving from an output of the transmission, to the front or rear axle and thus to the front or rear driving wheels of the vehicle.

The setting range of this coupling as a power transmission device extends entirely from a front axle which is decoupled from or to the drive train, which in one embodiment of the method is dragged, but not driven, up to a rigid connection with the rear axle and thus to the rear wheels, across the Cardan shaft as a power transmission device. In this case, the vehicle has no middle differential function.

If the electric machine is associated with the rear axle, the rear axle is correspondingly electrified and furthermore equipped with a connection to the Cardan shaft, making it possible to disconnect one of the two drive shafts as power transmission devices to at least one driving wheel from a differential. Thus, it is possible to switch on the rear axle when necessary for driving the vehicle. In one embodiment, the vehicle has a hybridized transmission as the power transmission device for the rear axle, in addition to the electric machine, a differential for the driving wheels and the Cardan shaft. Furthermore, it is possible to equip the transmission for the rear axle with a disconnectable drive shaft as the power transmission device.

With the method, it is possible to operate the vehicle as a plug-in hybrid vehicle (PHEV) or as a hybrid electric vehicle (HEV) with no charging function. In dynamic driving situations, torque from the combustion engine and/or the electric machine is conducted as needed across the hang-on coupling to the front axle. Moreover, it is possible to provide an all-wheel electrical drive with the hang-on coupling closed by and/or for the rear axle. A supplying of the vehicle with electric energy is provided bivalently through chemical energy from the battery and/or by the electric machine operating as a generator. In one embodiment of the method and/or the system, it is possible for the electric machine to be integrated in the rear axle, and the corresponding rear axle, equipped with the electric machine, is operated as a motor and/or as a generator. It is possible to also carry out a recuperation with the electric machine, in which case mechanical energy of the turning driving wheels is transformed by the electric machine into electric energy and provided to the at least one electric module.

If the vehicle stands still for a lengthy time, for example when it is in a traffic jam, or because the driver of the vehicle is waiting for something, in one embodiment of the method it is ensured that the vehicle can still be operated, even with an empty battery, regardless of the voltage level of that battery, for example a high-voltage battery and/or a traction battery with a voltage level of at least 60 Volt or a low-voltage battery with a lower voltage level of 48 Volt, for example. In this case, depending on the configuration, the front and/or the rear axle is separated or decoupled from the electric machine via the hang-on coupling. Furthermore, the electric machine, which is associated with the rear axle and integrated in it, for example, is decoupled and thus separated by the coupling of a drive shaft as the power transmission device from driving wheels. Thus, it is possible for the electric machine, connected for example to a rotating carrier of the rear and/or front axle, to turn freely with the Cardan shaft, without the vehicle moving, and furthermore it is possible for the combustion engine to be mechanically driven across the Cardan shaft by the electric machine. It is also possible to start the combustion engine in an appropriately selected gear by turning the Cardan shaft of the electric machine at, on, and/or in the rear axle, which is also possible in cold conditions, for example. In this case, a variant with the electric machine as a rear motor can be realized. It is possible to perform a starting of the combustion engines by turning the drive axle, configured as a Cardan shaft, and decoupled from the drive units. Thus, it is possible to do without a second starter system, such as a belt starter generator, for the combustion engine. Furthermore, it is possible, in an appropriately selected gear, to decouple the electric machine from driving axles and connect it across the drive shaft, configured for example as a Cardan shaft, to the combustion engine. In this case, the electric machine is operated as a generator across the operating combustion engine, mechanical energy of the combustion engine being transformed by the electric machine into mechanical energy for the onboard network as the electric module, charged in the onboard network, and provided to the onboard network.

With the method and/or the system, it is possible to carry out the described energy transfer functions for the vehicle, both when standing still and also when traveling, such as when coasting, a respective energy transfer function being realized in connection with a decoupled drive shaft as a power transmission device via the combustion engine or an internal combustion engine. It is possible for a drive shaft to be decoupled from the electric machine and/or the combustion engine on an axle, i.e., an axle of usually two axles of the vehicle configured for example as a motor vehicle.

In one embodiment of the method, it is possible for the electric machine to be integrated in a drive train of the vehicle in a so-called P0 architecture. The hang-on coupling is adapted to decouple the front and/or rear axle from the combustion engine and/or the electric machine. Alternatively or additionally, in a so-called P0 or P4 architecture, a decoupling of the electric machine from the driving wheels is possible. In an electrified vehicle with combustion engine, for which the proposed method can be carried out, the electric machine can be installed and/or arranged in a transmission bell housing. The electric machine in one embodiment of the method is used for starting the combustion engine, for pure electrical driving of the vehicle, and for a short-term boost operation of the vehicle, for example, the drive power of the vehicle being increased in such a boost operation. In order to realize a highly motorized drive concept for the vehicle, it is possible to avoid the otherwise potential problems, in that existing input limits for transmission in regard to permissible torque and power from the combustion engine, having six or eight cylinders for example, are eliminated. It is possible to further develop the transmission as a power transmission device, taking into account the design space requirements. Thus, the power and/or torque of the combustion engine does not have to be reduced. Neither is it necessary to reduce a possible additional power and a possible corresponding additional torque of the electric machine in a P0, P1 or P2 architecture.

The above-mentioned and the following explained features can be used not only in the particular indicated combination, but also in other combinations or standing alone.

BRIEF DESCRIPTION OF THE SEVERAL VIEWS OF THE DRAWINGS

Embodiments of the invention are represented schematically in the drawings and shall be described schematically and in detail, making reference to the drawings.

The figures shall be described in a single overlapping manner. The same components are associated with the same reference numbers.

DETAILED DESCRIPTION

Figure 1:
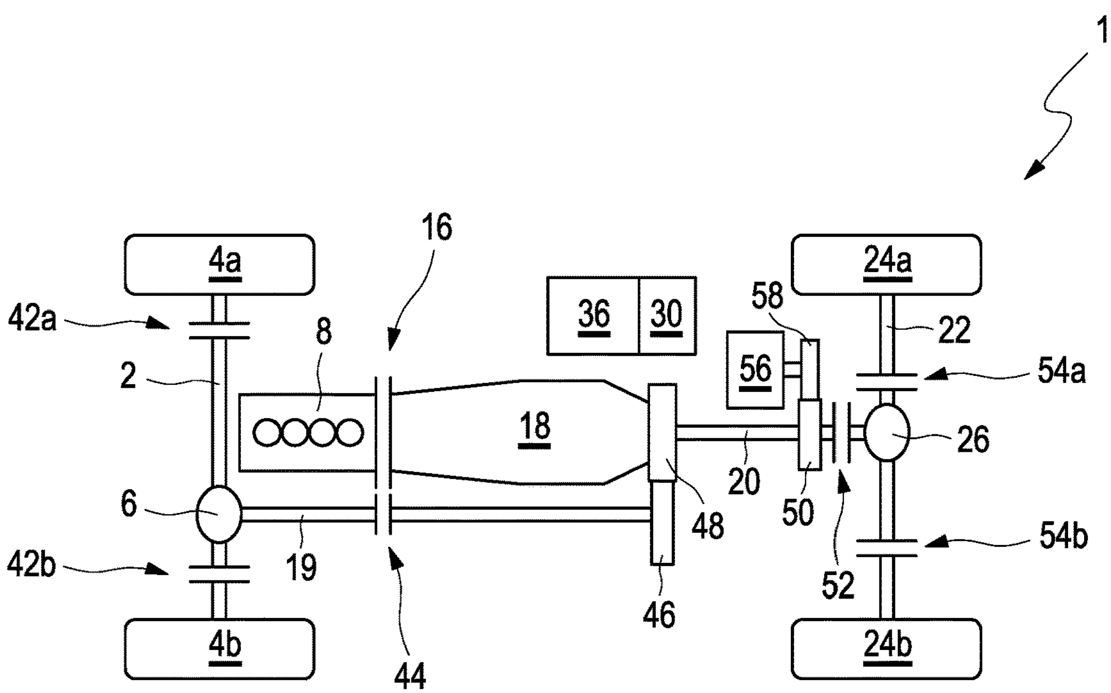
FIG. 1 shows in schematic representation a first example of a vehicle designed as a motor vehicle, having an embodiment of the system described herein to carry out an embodiment of the method described herein.

The first example of the vehicle 1 represented schematically in FIG. 1 comprises a front axle 2, on which two front driving wheels 4*a*, 4*b* are arranged. Furthermore, the front axle 2 comprises an axle differential 6 as the power transmission device. Furthermore, there are provided for driving the vehicle 1 a combustion engine 8, an electric machine 18 and a battery 36 as the electric module. In one configuration, the vehicle 1 comprises a transmission, in which the electric machine 18 is integrated. In this case, the axle differential 6 is connected across a respective coupling 42*a*, 42*b* as the power transmission device to a respective front driving wheel 4*a*, 4*b* in releasable manner. The combustion engine 8 is associated with the front axle 2 with the front driving wheels 4*a*, 4*b*, the combustion engine 8 being releasably connected to the front driving wheels 4*a*, 4*b* and adapted to drive the front driving wheels 4*a*, 4*b*.

The front axle 2, being here the axle differential 6 arranged on the front axle 2, and the electric machine 18 are furthermore connected or can be connected to each other across a drive shaft 19 as the primary power transmission device, this drive shaft 19 being designed as a Cardan shaft. At one end of the drive shaft 19, facing away from the front axle 2, there is arranged a transfer wheel 46, which is or can be connected releasably to a transfer wheel 48 on the electric machine 18, the two transfer wheels 46, 48 meshing together when they are connected to each other. These transfer wheels 46, 48 can be connected releasably to each other across an additional power transmission device, not further represented here. Along the drive shaft 19, between the electric machine 18 and the transfer wheels 46, 48, on one side, and the front axle 2 and the axle differential 6 on the other side, there is arranged a first primary coupling 44 as the primary power transmission device, which can be both closed and opened, it being possible for the front axle 2 and the front driving wheels 4*a*, 4*b* to be mechanically connected across the axle differential 6, across the coupling 44 along the drive shaft 19, to the transfer wheels 46, 48 and the electric machine 18 and to be driven by the electric machine 18 when the first primary coupling 44 is closed. If the first primary coupling 44 is opened, the electric machine 18 and the front axle 2 and thus the front driving wheels 4*a*, 4*b* are separated or decoupled.

The combustion engine 8 and the electric machine 18 here are or can be mechanically connected to each other across a secondary coupling 16 as the secondary power transmission devices. The electric machine 18 and the combustion engine 8 are mechanically connected to each other when the secondary coupling 16 is closed, and separated or decoupled from each other when the secondary coupling 16 is opened.

Furthermore, the electric machine 18 is or can be connected across a further drive shaft 20 as primary power transmission device, being designed here as a Cardan shaft, to an axle differential 26 of a rear axle 22 of the vehicle 1, on which two rear driving wheels 24*a*, 24*b* are arranged, the electric machine 18 being associated with the rear driving wheels 24*a*, 24*b* of the rear axle 22. Along the drive shaft 20 between the electric machine 18 and the axle differential 26 of the rear axle 22 there is arranged a second primary coupling 52 as a primary power transmission device. The rear axle 22 and the rear driving wheels 24*a*, 24*b* are mechanically connected across the drive shaft 20 to the electric machine 18 and driven by the electric machine 18 when the second primary coupling 52 is closed. If the second primary coupling 52 is opened, the electric machine 18 and the rear axle 22 and thus the rear driving wheels 24*a*, 24*b* are separated or decoupled from each other. Furthermore, along the drive shaft 20 between the electric machine 18, here the transfer wheel 48 arranged on it, and the second primary coupling 52, there is arranged a further transfer wheel 50. FIG. 1 also shows another electric machine 56 with a transfer wheel 58. The transfer wheel 50 on the drive shaft 20 is or can be releasably connected to the transfer wheel 58 on the other electric machine 56, the two transfer wheels 50, 58 meshing together when they are connected to each other, and these transfer wheels 50, 58 can be releasably connected to each other across an additional power transmission device, not otherwise represented here.

Moreover, the vehicle 1 comprises a control unit 30 to carry out a method as described herein, the control unit 30 being used to monitor and thus control and/or regulate the above described components of the vehicle 1. It is alternatively possible for the two axles 2, 22 to be interchanged in regard to the direction of forward movement of the vehicle 1, in which case the axle 2 described above as the front axle 2 is designed and/or designated and used accordingly as the rear axle 2 and conversely the axle 22 described above as the rear axle 22 is designed and/or designated and used accordingly as the front axle 22.

In an embodiment of the method to carry out a driving function of the vehicle 1, it is provided that at least one of the two axles 2, 22 and thus at least one of the two driving wheels 4*a*, 4*b*, 24*a*, 24*b* arranged respectively on them are mechanically connected across at least one power transmission device, not otherwise represented, to the combustion engine 8, the at least one axle 2, 22 being driven by the combustion engine 8. Alternatively or additionally, it is also possible for at least one of the two axles 2, 22 and thus respectively at least one driving wheel 4*a*, 4*b*, 24*a*, 24*b* arranged on it to be mechanically connected to and driven by the electric machine 18. In this case, the first primary coupling 44 will be closed and the electric machine 18 will be connected across the drive shaft 19 and the axle differential 6 to at least one of the two front driving wheels 4*a*, 4*b*. Alternatively or additionally, the second primary coupling 52 along the drive shaft 20, here the Cardan shaft, between the electric machine 18 and the rear axle 22, will be closed with the rear driving wheels 24*a*, 24*b*, and electric energy from the battery 36 of the electric machine 18 will be transformed into mechanical energy and transferred across the drive shaft 20 and the axle differential 26 to at least one of the two rear driving wheels 24*a*, 24*b*, which will be driven from the electric machine 18.

Furthermore, it is provided in the embodiment of the method that both couplings 44, 52 are opened by the control unit 30, whereupon both axles 2, 22 and thus also all driving wheels 4*a*, 4*b*, 24*a*, 24*b* are mechanically separated or decoupled from the electric machine 18. Moreover, in the method for carrying out energy transfer functions, the coupling 16 is closed by the control unit 30 and the electric machine 18 is mechanically connected to the combustion engine 8. If the combustion engine 8 is to be shut down while the vehicle 1 is standing still, it is possible for the electric machine 18 while carrying out a motor operation to transform electric energy from the battery 36 to mechanical energy, which is transferred across the coupling 16 to the combustion engine 8, whereupon the combustion engine 8 is driven and started by the electric machine 18. Alternatively, it is also possible for mechanical energy of the combustion engine 8 to be transferred across the coupling 16 to the electric machine 18, whereupon this mechanical energy is transformed by the electric machine 18 in a generator operation into electric energy, which in turn is transferred from the electric machine 18 to the battery 36, the battery 36 being charged in this way. It is also alternatively and additionally possible for the electric energy transformed by the electric machine 18 to be transferred to a further electric module of the vehicle 1, not otherwise represented here, such a further electric module being configured for example as an electrical consumer or as an onboard network of the vehicle 1. Alternatively or additionally, it is possible for the further electric machine 56 to be mechanically connected across the transfer wheels 50, 58 and the drive shaft 20 to the rear axle 22 and/or the first mentioned electric machine 18 and to exchange mechanical energy across such a mechanical connection of the rear axle 22 and/or the first mentioned electric machine 18.

It is thus possible, for the vehicle 1 with the electric machine 18 in driving operation or when carrying out a driving function, to drive at least one driving wheel 4*a*, 4*b*, 24*a*, 24*b*, and the combustion engine 8 can also be started with the electric machine 18. Furthermore, it is now possible to supply electric energy with the one electric machine 18 to at least one electric module, i.e., the battery 36 or a corresponding storage cell and, for example, an electrical air conditioning processor, as electrical consumers in the vehicle 1.

Figure 2:
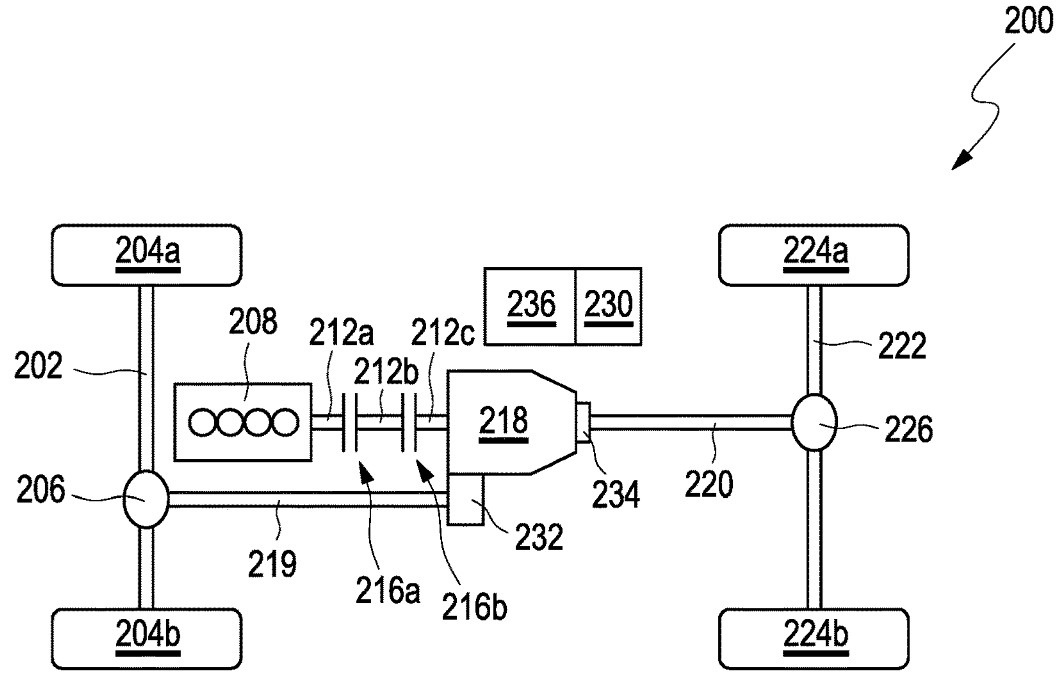
FIG. 2 shows in schematic representation a second example of a vehicle designed as a motor vehicle, having a second embodiment of the system described herein to carry out a second embodiment of the method described herein.

The second example of the vehicle 200 represented schematically in FIG. 2 comprises a front axle 202, on which two front driving wheels 204*a*, 204*b* are arranged. Furthermore, the front axle 202 comprises an axle differential 206 as the power transmission device. Furthermore, for the driving of the vehicle 200, there are provided a combustion engine 208, an electric machine 218 and a battery 236 as the electric module. In this case, the combustion engine 208 is associated with the front axle 202 with the front driving wheels 204*a*, 204*b*, the combustion engine 208 being releasably connected to the front driving wheels 204*a*, 204*b* and adapted to drive the front driving wheels 204*a*, 204*b*.

The axle differential 206 on the front axle 202 and the electric machine 218 are furthermore or can be connected to each other across a drive shaft 219 as the primary power transmission device, while between the drive shaft 219 and the electric machine 218 there is arranged a first primary coupling 232 as the primary power transmission device, which can be both closed and opened, it being possible for the front axle 202 and the front driving wheels 204*a*, 204*b* to be mechanically connected across the drive shaft 219 to the electric machine 218 and driven by the electric machine 218 when the first primary coupling 232 is closed. If the first primary coupling 232 is opened, the electric machine 218 and the front axle 202 and thus the front driving wheels 204*a*, 204*b* are separated or decoupled.

The combustion engine 208 and the electric machine 218 can be mechanically connected to each other here across three shaft segments 212*a*, 212*b*, 212*c* as secondary power transmission devices, there being arranged a secondary coupling 216*a*, 216*b* as a secondary power transmission device each time between two immediately adjacent shaft segments 212*a*, 212*b*, 212*c*. The electric machine 218 and the combustion engine 208 are mechanically connected to each other across the shaft segments 212*a*, 212*b*, 212*c* when both secondary couplings 216*a*, 216*b* are closed, and separated or decoupled from each other when at least one secondary coupling 216*a*, 216*b* is opened. The shaft segments 212*a*, 212*b*, 212*c* and the couplings 216*a*, 216*b* can also be designed and/or designated as parts of a transmission of the vehicle 200.

Furthermore, the electric machine 218 is or can be connected across a further drive shaft 220 as a primary power transmission device, which is configured here as a Cardan shaft, to an axle differential 226 of a rear axle 222 of the vehicle 200, on which two rear driving wheels 224*a*, 224*b* are arranged. Between the electric machine 218 and the drive shaft 220 there is arranged a second primary coupling 234 as the primary power transmission device. The rear axle 222 and the rear driving wheels 224*a*, 224*b* are mechanically connected across the drive shaft 220 to the electric machine 218 and driven by the electric machine 218 when the second primary coupling 234 is closed. If the second primary coupling 234 is opened, the electric machine 218 and the rear axle 222 and thus the rear driving wheels 224*a*, 224*b* are separated or decoupled from each other.

Moreover, the vehicle 200 comprises a control unit 230 to carry out a method as described herein, the control unit 230 being used to monitor and thus control and/or regulate the above described components of the vehicle 200.

In one embodiment of the method to carry out a driving function of the vehicle 200, it is provided that at least one of the two axles 202, 222 and thus at least one of the two driving wheels 204*a*, 204*b*, 224*a*, 224*b* arranged respectively on them are mechanically connected across at least one power transmission device, not otherwise represented, to the combustion engine 208, the at least one axle 202, 222 being driven by the combustion engine 208. Alternatively or additionally, it is also possible for at least one of the two axles 202, 222 and thus respectively at least one driving wheel 204*a*, 204*b*, 224*a*, 224*b* arranged on it to be mechanically connected to and driven by the electric machine 218. In this case, the first primary coupling 232 will be closed and the electric machine 218 will be connected across the drive shaft 219 and the axle differential 206 to at least one of the two front driving wheels 204*a*, 204*b*. Alternatively or additionally, the second primary coupling 234 between the electric machine 218 and the drive shaft 220, here the Cardan shaft, will be closed, and electric energy from the battery 236 will be transformed by the electric machine 218 into mechanical energy and transferred across the drive shaft 220 and the axle differential 226 to at least one of the two rear driving wheels 224*a*, 224*b*, which will be driven from the electric machine 218.

Furthermore, it is provided in the embodiment of the method that both couplings 232, 234 are opened by the control unit 230, whereupon both axles 202, 222 and thus also all driving wheels 204*a*, 204*b*, 224*a*, 224*b* are mechanically separated or decoupled from the electric machine 218. Moreover, in the method for carrying out energy transfer functions, both couplings 216*a*, 216*b* are closed by the control unit 230 and the electric machine 218 is mechanically connected to the combustion engine 208 across the shaft segments 212*a*, 212*b*, 212*c*. If the combustion engine 208 is to be shut down while the vehicle 200 is standing still, it is possible for the electric machine 218 while carrying out a motor operation to transform electric energy from the battery 236 into mechanical energy, which is transferred across the shaft segments 212*a*, 212*b*, 212*c* to the combustion engine 208, whereupon the combustion engine 208 is driven and started by the electric machine 218. Alternatively, it is also possible for mechanical energy of the combustion engine 208 to be transferred across the shaft segments 212*a*, 212*b*, 212*c* to the electric machine 218, whereupon this mechanical energy is transformed by the electric machine 218 in a generator operation into electric energy, which in turn is transferred from the electric machine 218 to the battery 236, the battery 236 being charged in this way. It is also alternatively and additionally possible for the electric energy transformed by the electric machine 218 to be transferred to a further electric module of the vehicle 200, not otherwise represented here, such a further electric module being configured for example as an electrical consumer or as an onboard network of the vehicle 200.

Thus it is possible that only one electric machine 218 is required for the vehicle 200, which drives at least one driving wheel 204*a*, 204*b*, 224*a*, 224*b* in the driving operation or when carrying out a driving function and which is adapted, when carrying out at least one energy transfer function, to start the combustion engine 208 at vehicle standstill, so that the otherwise customary belt starter generator for the combustion engine 208 can be eliminated. Moreover, it is now possible to supply electric energy with the one electric machine 218 to at least one electric module, i.e., the battery 236 or a corresponding storage cell and, for example, an electrical air conditioning processor, as electrical consumers in the vehicle 200.

In one embodiment of the method it is possible to carry out two different energy transfer functions during both standstill and travel of the vehicle 200. In this case, the control unit 230 is adapted to actuate all primary power transmission devices between drive units of the vehicle 200, i.e., the combustion engine 208 and the electric machine 218, and to separate these drive units from the axles 202, 222 as well as from the driving wheels 204*a*, 204*b*, 224*a*, 224*b*, the control unit 230 causing these drive units to be decoupled from the axles 202, 222 and thus from the driving wheels 204*a*, 204*b*, 224*a*, 224*b*. Furthermore, secondary power transmission devices between the electric machine 218 and the combustion engine 208 are actuated and activated by the control unit 230, for example they are closed, whereupon the electric machine 218 and the combustion engine 208 are mechanically connected to each other. A generator operation is brought about by the control unit 230 for the electric machine 218 during a first energy transfer function, wherein mechanical energy of the operating combustion engine 208 is transformed into electric energy by the electric machine 218 and provided to at least one electric module in an onboard network of the vehicle 200, which will be the case when the control unit 230 detects that the at least one electric module is in need of electric energy. During a second energy transfer function, in the event that the combustion engine 208 is shut down, which is detected by the control unit 230, a motor operation is brought about by the control unit 230 for the electric machine 218, whereupon electric energy from the battery 236 is transformed into mechanical energy by the electric machine 218 and transferred across the described secondary power transmission devices to the combustion engine 208, the combustion engine 208 being driven and/or started in this case.

German patent application no. DE 10 2021 115476.6, filed Jun. 15, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a vehicle including a combustion engine, a first drive shaft, a second drive shaft, a first electric machine selectively coupled to the first drive shaft and coupled to the second drive shaft, a second electric machine selectively coupled to the second drive shaft, a front axle with front driving wheels, a rear axle with rear driving wheels, at least one electric module, at least one primary power transmission device, and at least one secondary power transmission device, wherein the at least one primary power transmission device, in operation, is closed and opened, wherein the at least one secondary power transmission device, in operation, is closed and opened, wherein the at least one primary power transmission device selectively connects the first electric machine to at least one of the driving wheels of a first one of the front axle and the rear axle while the at least one primary power transmission device is closed and separates the first electric machine from the at least one of the driving wheels of the first one of the front axle and the rear axle while the at least one primary power transmission device is open, wherein the at least one primary power transmission device selectively connects the combustion engine and the second electric machine to at least one driving wheel of a second one of the front axle and the rear axle while the at least one primary power transmission device is closed and separates the combustion engine and the second electric machine from the at least one of the driving wheels of the second one of the front axle and the rear axle while the at least one primary power transmission device is open, and wherein the at least one secondary power transmission device selectively connects the first electric machine to the combustion engine while the at least one secondary power transmission device is closed and separates the first electric machine from the combustion engine while the at least one primary power transmission device is open, the method comprising:

- performing, by a control unit, a first energy transfer function for the vehicle; and
- performing, by the control unit, a second energy transfer function for the vehicle;
- wherein the performing the first energy transfer function and the performing the second energy transfer function include controlling the at least one primary power transmission device to separate the first electric machine from the at least one of the driving wheels while controlling the at least one secondary power transmission device to connect the first electric machine to the combustion engine;
- wherein the performing the first energy transfer function includes controlling the combustion engine to perform a generator operation in which mechanical energy of the combustion engine is transformed into electrical energy by the first electric machine and provided to the at least one electric module; and
- wherein the performing the second energy transfer function includes controlling the first electric machine to perform a motor operation in which electric energy from the at least one electric module is transformed into mechanical energy by the first electric machine and provided to the combustion engine.

2. The method according to claim 1, wherein at least one of the first energy transfer function and the second energy transfer function is performed when the vehicle is stationary.

3. The method according to claim 1, wherein at least one of the first energy transfer function and the second energy transfer function is performed when the vehicle is moving.

4. The method according to claim 1, wherein the at least one electric module includes a battery, an electrical onboard network, and/or an electrical consumer of the vehicle, and wherein, when the first energy transfer function is performed, the battery is charged with electric energy, and/or the electrical onboard network and/or the electrical consumer is supplied with electric energy from the first electric machine.

5. The method according to claim 4 wherein the electrical consumer is an air conditioning compressor.

6. The method according to claim 1, wherein the first electric machine and the second electric machine are associated with the rear driving wheels and connected across the at least one primary power transmission device to the rear driving wheels, and wherein the combustion engine is associated with the front driving wheels and connected across the at least one primary power transmission device to the front driving wheels.

7. The method according to claim 1, wherein the at least one primary power transmission device includes a hang-on coupling and/or a transmission.

8. The method according to claim 1, wherein the at least one secondary power transmission device includes a drive shaft and/or a transmission.

9. The method according to claim 8 wherein the drive shaft is a Cardan shaft.

10. The method according to claim 1, further comprising:

performing at least one driving function, wherein the at least one secondary power transmission device is opened, wherein the first electric machine and the combustion engine are separated, wherein the at least one primary power transmission device is closed or opened, wherein the first electric machine is connected to the at least one of the driving wheels or separated from the at least one of the driving wheels, wherein the at least one of the driving wheels is purely electrically driven, purely combustion engine-driven, or hybrid driven, and wherein only the front driving wheels, only the rear driving wheels, or all the front and the rear driving wheels are driven.

11. The method according to claim 1, wherein the vehicle includes multiple axles on which the front and the rear driving wheels are arranged, and wherein multiple gears are provided for at least one of the axles.

12. A system for operating a vehicle including a combustion engine, a first drive shaft, a second drive shaft, a first electric machine selectively coupled to the first drive shaft and coupled to the second drive shaft, a second electric machine selectively coupled to the second drive shaft, a front axle with front driving wheels, a rear axle with rear driving wheels, at least one electric module, at least one primary power transmission device, and at least one secondary power transmission device, wherein the at least one primary power transmission device, in operation, is closed and opened, wherein the at least one secondary power transmission device, in operation, is closed and opened, wherein the at least one primary power transmission device selectively connects the first electric machine to at least one of the driving wheels of a first one of the front axle and the rear axle while the at least one primary power transmission device is closed and separates the first electric machine from the at least one of the driving wheels of the first one of the front axle and the rear axle while the at least one primary power transmission device is open, wherein the at least one primary power transmission device selectively connects the combustion engine and the second electric machine to at least one of the driving wheels of a second one of the front axle and the rear axle while the at least one primary power transmission device is closed and separates the combustion engine and the second electric machine from the at least one of the driving wheels of the second one of the front axle and the rear axle while the at least one primary power transmission device is open, and wherein the at least one secondary power transmission device selectively connects the first electric machine to the combustion engine while the at least one secondary power transmission device is closed and separates the first electric machine from the combustion engine while the at least one primary power transmission device is open, the system comprising:

a control unit that, in operation, controls performance of a first energy transfer function and a second energy transfer function for the vehicle, when the vehicle is stationary;

wherein the control unit, while the first energy transfer function and the second energy transfer function are performed, controls the at least one primary power transmission device to separate the first electric machine from the at least one of the driving wheels;

wherein the control unit, while the first energy transfer function and the second energy transfer function are performed, controls the at least one secondary power transmission device to connect the first electric machine to the combustion engine;

wherein the control unit, while the first energy transfer function is performed, controls the first electric machine to carry out a generator operation in which mechanical energy of the combustion engine is transformed into electrical energy by the first electric machine and provided to the at least one electric module;

wherein the control unit, while the second energy transfer function is performed, controls the first electric machine to carry out a motor operation in which electric energy from the at least one electric module is transformed into mechanical energy and provided to the combustion engine.

* * * * *